(12) United States Patent
Otsuka et al.

(10) Patent No.: US 7,771,603 B2
(45) Date of Patent: Aug. 10, 2010

(54) PROCESS FOR POLISHING GLASS SUBSTRATE

(75) Inventors: Koji Otsuka, Yokohama (JP); Masabumi Ito, Yokohama (JP); Hiroshi Kojima, Hitachinaka (JP)

(73) Assignee: Asahi Glass Company, Limited, Tokyo (JP)

( * ) Notice: Subject to any disclaimer, the term of this patent is extended or adjusted under 35 U.S.C. 154(b) by 587 days.

(21) Appl. No.: 11/779,441

(22) Filed: Jul. 18, 2007

(65) Prior Publication Data

US 2007/0259605 A1 Nov. 8, 2007

Related U.S. Application Data

(63) Continuation of application No. PCT/JP2006/301257, filed on Jan. 20, 2006.

(30) Foreign Application Priority Data

Feb. 2, 2005 (JP) .............................. 2005-026365

(51) Int. Cl.
*C03C 15/00* (2006.01)
(52) U.S. Cl. .............................. 216/38; 216/59; 216/60; 216/66; 216/80; 451/41; 204/192.33; 204/192.34; 204/192.37
(58) Field of Classification Search ........................ None
See application file for complete search history.

(56) References Cited

U.S. PATENT DOCUMENTS

| 6,288,357 | B1 | 9/2001 | Dyer | |
|---|---|---|---|---|
| 6,537,606 | B2 | 3/2003 | Allen et al. | |
| 6,537,648 | B1 * | 3/2003 | Takahashi et al. | 428/141 |
| 6,811,467 | B1 * | 11/2004 | Beresford et al. | 451/28 |
| 7,549,141 | B2 * | 6/2009 | Ikuta et al. | 716/19 |
| 7,622,050 | B2 * | 11/2009 | Otsuka et al. | 216/66 |
| 2004/0060900 | A1 | 4/2004 | Waldhauer et al. | |
| 2004/0192063 | A1 * | 9/2004 | Koike | 438/736 |
| 2004/0192171 | A1 * | 9/2004 | Koike | 451/5 |
| 2007/0059608 | A1 * | 3/2007 | Ikuta et al. | 430/5 |
| 2007/0125747 | A1 * | 6/2007 | Otsuka et al. | 216/66 |
| 2008/0142480 | A1 * | 6/2008 | Otsuka | 216/59 |

FOREIGN PATENT DOCUMENTS

| JP | 8-120470 | 5/1996 |
|---|---|---|
| JP | 2003-505891 | 2/2003 |
| WO | WO 2005/123617 | 12/2005 |

OTHER PUBLICATIONS

U.S. Appl. No. 12/631,304, filed Dec. 4, 2009, Okamura, et al.
U.S. Appl. No. 12/648,481, filed Dec. 29, 2009, Ito, et al.
Kirkpatrick, Nuclear Instruments and Methods in Physics Research, B 206: 830-837, 2003 "Gas Cluster ion beam applications and equipment".

* cited by examiner

*Primary Examiner*—Anita K Alanko
(74) *Attorney, Agent, or Firm*—Oblon, Spivak, McClelland, Maier & Neustadt, L.L.P.

(57) ABSTRACT

A process for polishing a glass substrate, which enables to polish a glass substrate having a large waviness formed by mechanical polishing, to have a surface excellent in flatness, is provided.

A process for polishing a glass substrate, comprising a step of measuring the surface profile of a mechanically polished glass substrate to identify the width of waviness present in the glass substrate, and a step of applying dry etching using a beam having a beam size in FWHM (full width of half maximum) value of at most the above size of waviness, to polish the surface of the glass substrate.

8 Claims, No Drawings

PROCESS FOR POLISHING GLASS SUBSTRATE

TECHNICAL FIELD

The present invention relates to a process for polishing a glass substrate, in particular, to a process for polishing a glass substrate required to have a high degree of flatness and smoothness such as a glass substrate to be used for a reflection type photomask for EUV (Extreme Ultra Violet) lithography in a semiconductor manufacturing process.

BACKGROUND ART

Heretofore, an exposure apparatus has been widely used for transferring a fine circuit pattern onto a wafer to produce an integrated circuit in the lithography technique. According to the progress in achieving high integration, high response speed and high performance of integrated circuits, miniaturization of the integrated circuits has progressed and the exposure apparatuses are requested to form an image of a circuit pattern on a wafer surface with a long focal depth and with high resolution, and use of an exposure light source emitting shorter wavelength has been in progress. As the exposure light source, besides the conventional g-line (wavelength 436 nm), i-line (wavelength 365 nm) and KrF excimer laser (wavelength 248 nm), ArF excimer laser (wavelength 193 nm) is starting to be employed. Further, in order to deal with next-generation integrated circuits having a circuit line width of at most 100 nm, F2 laser (wavelength 157 nm) is regarded as a predominant candidate for the exposure light source, but this light source is considered to cover only until the generation of 70 nm line width.

In such a technical trend, as a next generation exposure light source, a lithography technique using EUV light (extreme ultra violet light) attracts attention since it is considered to be applicable for plural generations of 45 nm and after. EUV light means light in a wavelength band in a soft X-ray region or in a vacuum ultra violet region, and specifically, light having a wavelength of from 0.2 to 100 nm. Currently, as a lithography light source, use of 13.5 nm has been studied. The principle of the exposure in this EUV lithography (hereinafter referred to as "EUVL") is the same as the conventional lithography in that a mask pattern is transferred by employing a projection optical system. However, since there is no material transmitting light in the energy region of EUV light, it is not possible to use a refraction optical system, and a reflection optical system has to be employed instead. (Refer to Patent Document 1: JP-A-2003-505891)

A mask to be used for EUVL is basically constituted by (1) a glass substrate, (2) a reflective multi-layer film formed on the glass substrate, and (3) an absorptive material layer formed on the reflective multi-layer film. As the reflective multi-layer film, one having a structure that a plurality of materials having different refractive indexes at the wavelength of the exposure light, periodically laminated with the period in the order of nm, is employed, and Mo and Si are known as the typical materials. Further, as the absorptive layer, Ta and Cr are studied. As the glass substrate, a material having a low thermal-expansion coefficient is required so as not to have deformation even under irradiation of EUV light, and a glass having a low thermal-expansion coefficient or a crystallized glass have been studied. The glass substrate is produced by polishing such a glass or crystallized glass material with high precision and cleaning.

The glass substrate to be used for a mask of EUVL having a low thermal expansion coefficient, may, be a synthesized quartz glass substrate doped with e.g. Ti. It has become apparent that when the surface of this glass substrate is mechanically polished by a polishing pad with a free abrasive, local waviness may be formed on the surface of the glass substrate due to local difference in the composition of the material of the substrate. It has become necessary to efficiently remove this waviness to improve the flatness of the surface of a glass substrate.

Patent Document 1: JP-A-2003-505891
Patent Document 2: JP-A-8-120470

DISCLOSURE OF THE INVENTION

Problems to be Solved by the Invention

In order to solve the above problems of prior arts, it is an object of the present invention to provide a process for polishing a glass substrate, which enables to polish a surface of glass substrate having large waviness formed by mechanical polishing into a surface excellent in flatness.

Means for Solving the Problems

In order to achieve the above object, the present invention provides a process (hereinafter referred to as "glass polishing process of the present invention") for polishing a glass substrate, comprising measuring the surface profile of a mechanically polished glass substrate to identify the width of waviness present in the glass substrate surface, and applying dry etching using a beam having a beam size of at most the width of the waviness, the beam size being in terms of FWHM (full width of half maximum) value, to polish the surface of the glass substrate.

In the glass polishing process of the present invention, it is preferred that the beam size in FWHM value is at most a half of the width of waviness.

In the glass polishing process of the present invention, it is preferred that the dry etching is a gas cluster ion beam etching.

It is preferred that the source gas for the gas cluster ion beam etching is one member selected from the group consisting of a mixed gas of $SF_6$ and $O_2$, a mixed gas of $SF_6$, Ar and $O_2$, a mixed gas of $NF_3$ and $O_2$, a mixed gas of $NF_3$, Ar and $O_2$, a mixed gas of $NF_3$ and $N_2$, and a mixed gas of $NF_3$, Ar and $N_2$.

It is more preferred that the source gas is one member selected from the group consisting of a mixed gas of $SF_6$ and $O_2$, a mixed gas of $SF_6$, Ar and $O_2$, a mixed gas of $NF_3$ and $O_2$ and a mixed gas of $NF_3$, Ar and $O_2$.

It is preferred that the glass substrate is made of a low expansion glass having a thermal expansion coefficient of 0±30 ppb/° C. at 20° C.

It is preferred that the low expansion glass is a quartz glass having $SiO_2$ as the main component.

In the glass polishing method of the present invention, it is preferred that the mechanically polished glass substrate has a flatness of at most 500 nm and a surface roughness (Rms) of at most 5 nm.

EFFECT OF THE INVENTION

According to the glass polishing process of the present invention, it is possible to polish a surface of a glass substrate having large waviness formed by mechanical polishing, into a surface excellent in flatness. By this process, a glass substrate excellent in flatness usable as a substrate for optical parts of an exposure apparatus for producing next-generation semiconductors having a line width of 45 nm or smaller.

BEST MODE FOR CARRYING OUT THE INVENTION

The glass polishing process of the present invention is suitable for finishing of a glass substrate for reflection type mask for EUVL capable to cope with progress of high-integration and high-precision of integrated circuits. A glass substrate to be used for this application, is a glass substrate having small thermal expansion coefficient with small variation of the thermal expansion coefficient, and is preferably made of a low expansion glass having a thermal expansion coefficient of 0±30 ppb/° C. at 20° C. more preferably made of a superlow expansion glass having a thermal expansion coefficient of 0±10 ppb/° C. at 20° C.

A specific example of such a low expansion glass or a superlow expansion glass, may, for example, be a quartz glass having $SiO_2$ as the main component, and more specifically, for example, a low expansion glass or a low expansion crystal glass such as a synthesized quartz glass containing $TiO_2$, ULE (tradename) code 7972 (manufactured by Corning) or ZERODUR (tradename) (manufactured by Shott).

The shape, the size and the thickness etc. of the glass substrate are not particularly limited but in a case of a substrate for reflection type mask for EUVL, the shape is rectangular or square in plane view.

A glass substrate finished by the polishing process of the present invention, is previously mechanically polished to have a predetermined flatness and surface roughness.

In the present invention, the flatness of the surface of such a mechanically polished glass substrate is preferably at most 500 nm, more preferably at most 400 nm. If the flatness is more than 500 nm, it takes a considerable time to improve the flatness by the polishing process of the present invention, which causes increase of cost. Flatness in this specification means the flatness in a unit area (142 mm square). Here, the flatness of the surface of glass substrate can be measured, for example, by a laser interferometric flatness tester. In the examples described later, the flatnesses of the surfaces of glass substrates were measured by a G310S Fizeau type laser interferometric flatness tester (manufactured by Fujinon Corporation). However, means for measuring the flatness of the surface of glass substrate is not limited to this, and the flatness may be determined by measuring vertical profile of the surface of glass substrate by using a laser displacement meter, an ultrasonic displacement meter or a contact type displacement meter and calculating the flatness from the measurement result.

In the present invention, the surface roughness (Rms) of a mechanically polished glass substrate is preferably at most 5 nm, more preferably at most 1 nm. Surface roughness in this specification means a surface roughness measured by an atomic force microscope. If the surface roughness of a mechanically polished glass substrate is more than 5 nm, it takes a considerable time to polish the substrate to have a desired surface roughness by using the polishing process of the present invention, which causes increase of cost.

The method for mechanically polishing a glass substrate is not particularly limited, and it may be widely selected from known mechanical polishing methods to be used for polishing glass surfaces. Here, the mechanical polishing method in this specification includes not only methods of polishing only using polishing effect by abrasives, but also chemical mechanical polishing method using polishing function by abrasives and chemical polishing function by chemicals in combination. Here, the mechanical polishing method may be any one of lap polishing or polish-polishing, and polishing tools and abrasives may be appropriately selected from known polishing tools and abrasives.

In the polishing process of the present invention, the surface profile of a mechanically polished glass substrate is measured to identify the width of waviness present in the surface of glass substrate. The measurement of the surface profile of glass substrate, can be carried out by employing the above-mentioned means for measuring the flatness of glass substrate. However, from the viewpoint of measurement accuracy, it is preferred to use a laser interferometric flatness tester for measurement. In this specification, waviness means an irregularity present in the surface of glass substrate, which has a period of from 5 to 30 mm.

In the polishing method of the present invention, the width of waviness present in the surface of glass substrate is identified based on the result of measurement of the surface profile of a mechanically polished glass substrate. In this specification, the width of waviness means the length of recess or projecting portion in an irregularity periodically present in the surface of glass substrate. Therefore, the width of waviness is usually a half of the period of waviness.

Here, if there are plural wavinesss having different periods are present on the surface of glass substrate, the width of waviness is defined as the width of an waviness having the smallest period.

In the polishing method of the present invention, based on the width of waviness identified by the above procedure, using a beam having a beam size smaller than the width of waviness, a dry etching is carried out to polish the surface of glass substrate. Here, the beam size is based on FWHM (full width of half maximum) value. In the following, in this specification, beam size means a FWHM value of beam size. In the polishing process of the present invention, it is preferred to use a beam having a beam size of at most a half of the width of waviness. If a beam having a beam size of at most the width of waviness is used, it becomes possible to irradiate a waviness present on the surface of glass substrate with the beam in a concentrated manner, whereby the waviness is effectively removed.

In the polishing process of the present invention, since a beam having a beam size of at most the width of waviness, it is necessary to scan the beam to irradiate entire surface of the glass substrate with the beam. At this time, the irradiation conditions such as irradiation amount (dose) or irradiation intensity may be selectively changed based on the measurement result of surface profile of glass substrate, while the beam is scanned.

In the polishing process of the present invention, the dry etching method to be used is not particularly limited so long as it uses a beam having a beam size of at most the width of waviness, and it may be a plasma beam etching or a normal ion beam etching using various types of ion beams. However, a gas cluster ion beam etching is preferably employed since it can polish the substrate to obtain a surface having small surface roughness and excellent in smoothness.

A gas cluster ion beam etching is a method of blowing out a reactive material (source gas) that is in a state of gas at room temperature and atmospheric pressure, into a vacuum chamber through an expansion type nozzle in a pressurized state to form a gas cluster, irradiating the gas cluster with an electron beam to form an ionized gas cluster ion beam, and irradiating an object to be etched with the gas cluster ion beam. Such a gas cluster is usually constituted of an agglomerated group of atoms or molecules constituted of thousands of atoms or molecules. In a case where a gas cluster ion beam etching is employed in the polishing process of the present invention, when a gas cluster collides with the surface of the glass substrate, a multi-body collision effect is formed by an interaction with solid body, to polish the surface of glass substrate.

In a case where a gas cluster ion beam etching is employed in the polishing process of the present invention, a source gas may, for example, be a gas such as $SF_6$, Ar, $O_2$, $N_2$, $NF_3$, $N_2O$, $CHF_4$, $C_2F_6$, $C_3F_8$, $SiF_4$ or $COF_2$, and these gases may be used alone or used as a mixture. Among these, $SF_6$ and $NF_3$ are excellent as source gases in terms of chemical reaction occurred when they collides with the surface of glass substrate. Therefore, a mixed gas containing $SF_6$ or $NF_3$, specifically, a mixed gas of $SF_6$ and $O_2$, a mixed gas of $SF_6$, Ar and $O_2$, a mixed gas of $NF_3$ and $O_2$, a mixed gas of $NF_3$, Ar and $O_2$, a mixed gas of $NF_3$ and $N_2$, or a mixed gas of $NF_3$, Ar and $N_2$, is preferred. Preferred mixture ratios of these mixed gases depend on e.g. irradiation conditions, but they are preferably within the following ranges respectively.

$SF_6:O_2$=0.1 to 5%:95 to 99.9% (a mixed gas of $SF_6$ and $O_2$)
$SF_6:Ar:O_2$=0.1 to 5%:9.9 to 49.9%:50 to 90% (a mixed gas of $SF_6$, Ar and $O_2$)
$NF_3:O_2$=0.1 to 5%:95 to 99.9% (a mixed gas of $NF_3$ and $O_2$)
$NF_3:Ar:O_2$=0.1 to 5%:9.9 to 49.9%:50 to 90% (a mixed gas of $NF_3$, Ar and $O_2$)
$NF_3:N_2$=0.1 to 5%:95 to 99.9% (a mixed gas of $NF_3$ and $N_2$)
$NF_3:Ar:N_2$=0.1 to 5%:9.9 to 49.9%:50 to 90% (a mixed gas of $NF_3$, Ar and $N_2$)

Among these mixed gases, a mixed gas of $SF_6$ and $O_2$, a mixed gas of $SF_6$, Ar and $O_2$, a mixed gas of $NF_3$ and $O_2$, or a mixed gas of $NF_3$, Ar and $O_2$, is preferred.

Here, irradiation conditions such as a cluster size, an ionizing current to be applied to an ionizing electrode of the gas cluster ion beam etching apparatus for ionizing a cluster, an acceleration voltage to be applied to an acceleration electrode of the gas cluster ion beam etching apparatus, and the dose of gas cluster ion beam, may be appropriately selected depending on the type of source gas or the surface state of mechanically polished glass substrate. For example, the acceleration voltage to be applied to the acceleration electrode is preferably from 15 to 30 kV in order to remove an waviness from the surface of glass substrate to improve the flatness without excessively deteriorating the surface roughness of glass substrate.

According to the polishing process of the present invention, since a glass substrate is polished by applying dry etching using a beam having a beam size of at most the width of waviness, it is possible to effectively remove waviness on the surface of glass substrate formed by mechanical polishing, to form a surface excellent in flatness. By using the polishing process of the present invention, it is possible to improve the flatness of the surface of glass substrate to be at most 50 nm.

After carrying out the glass polishing process of the present invention, if waviness is still found on the surface of glass substrate by measurement of the surface profile of the glass substrate, dry etching may be conducted again using a beam having a beam size of at most the width of waviness that is identified from the measurement result of the surface profile.

Further, before carrying out the glass polishing process of the present invention, e.g. plasma etching may be conducted as a pretreatment for reducing waviness on the surface of a mechanically polished glass substrate.

In a case where the glass polishing process of the present invention is conducted, the surface roughness of glass substrate may be slightly deteriorated in some cases depending on the surface profile of the glass to be polished, or on the beam irradiation conditions. Further, depending on the specification of glass substrate, there may be a case where desired flatness can be achieved but desired surface roughness can not be achieved by the glass polishing process of the present invention. Therefore, after carrying out the glass polishing process of the present invention, a polishing treatment to improve the surface roughness of the glass substrate may be carried out. The polishing treatment to be carried out for such a purpose, is preferably a gas cluster ion beam etching. Therefore, in a case where a gas cluster ion beam etching is further carried out in the polishing process of the present invention, such a second gas cluster ion beam etching is carried out under different irradiation conditions such as source gas, ionizing current and acceleration voltage. Specifically, such a second gas cluster ion beam etching is preferably carried out under milder conditions such as lower ionizing current or lower acceleration voltage than those of the gas cluster ion beam etching for removing waviness formed by mechanical polishing. Specifically, for example, the acceleration voltage is preferably at least 3 kV and less than 30 kV, more preferably from 3 to 20 kV. Further, as the source gas, a gas such as $O_2$, Ar, CO or $CO_2$ may be used alone or as a mixture since these gases are not likely to cause chemical reactions when they collide with the surface of glass substrate. Among these, $O_2$ or Ar is preferred.

Examples

From now, the present invention will be described more specifically based on an Example. However, the present invention is not limited to this Example.

As an object to be polished, an ingot of Ti doped synthesized quartz glass produced by a known method, was prepared, it was cut into a plate shape of 153.0 mm high×153.0 mm wide×6.75 mm thick by using an inner blade slicer, to prepare 60 pieces of plate-shaped samples of Ti doped synthesized quartz glass. Then, a chamfering treatment was carried out to these samples by using a commercially available NC chamfering machine with a diamond grinding stone of #120, so that each sample have an external dimension of 152 mm and a chamfering width of from 0.2 to 0.4 mm. These plate-shaped samples are mechanically polished by the following procedure.

Mechanical Polishing

Each of the plate-shaped synthesized quartz glass samples obtained by the above procedure was polished by employing a 20B double-sided lapping machine manufactured by Speedfam Co., Ltd. and employing as an abrasive, a slurry with from 18 to 20 mass % of GC#400 (manufactured by Fujimi Incorporated) suspended in a filtered water, so that the thickness became 6.63 mm.

Then, by employing another 20B double-sided lapping machine, and as an abrasive, a slurry with from 18 to 20 mass % of suspended FO#1000 (manufactured by Fujimi Incorporated), each plate was polished until the thickness became 6.51 mm. Then, using a slurry containing cerium oxide as the main constituent and a buff, the outer periphery of the plate was polished to remove 30 μm as a mirror finish process of end faces.

Then, both surfaces of each of these plates were polished to remove 50 μm in total for both surfaces as a first-polishing by employing a 20B double-sided polishing machine with, as an abrasive cloth, LP66 (manufactured by Rhodes Co.) and as an abrasive, a slurry with from 10 to 12 mass % of suspended Mirek 801A (manufactured by Mitsui Kinzoku Co.).

Further, by employing the 20B double-sided polishing machine, and employing as an abrasive cloth, Seagull 7355

(manufactured by Toray Coatex Co., Ltd.) and as an abrasive, the above-mentioned Mirek 801A, both surfaces of each of the above plates were polished to remove 10 μm in total for both surfaces.

To the plate-shaped samples mechanically polished by the above procedure, a simple cleaning and a precise cleaning were applied, and the flatness as well as the surface profile of the plate-shaped samples were measured by a G310S Fizeau type laser interferometric flatness tester (manufactured by Fujinon Corporation) Further, the surface roughness of these plate-shaped samples were measured by an atomic force microscope (AFM) SPA460 (manufactured by Seiko Instruments Inc.). As a result, the flatness of the surface of these plate-shaped samples was 337 nm/142 mm square, and a ring shaped waviness of about 50 nm (high)/30 mm (wide) was observed on the surface. The surface roughness (Rms) of the plate-shaped samples was 0.2 nm.

To the mechanically polished plate-shaped samples, a gas cluster ion beam etching was applied under the following conditions to polish the plate-shaped samples.

Source gas: Mixture gas of $SF_6$ 1.25%, $O_2$ 24%, Ar 74.75% (volume %)

Acceleration voltage: 30 kV

Cluster size: At least 1,000

Beam current: 50 μA

Beam size (FWHM value): At most 7.5 mm

A beam was scanned over the surface of a plate-shaped sample of 142 mm square so that the entire surface is irradiated with the beam, controlling the dose amount by controlling the scanning speed.

With respect to the plate-shaped samples polished, the flatness of the surface and the surface roughness were measured. As a result, the flatness was improved to 49.7 nm/142 mm square, and the ring-shaped waviness was reduced to 20 nm/30 mm. However, the surface roughness (Rms) was deteriorated to 1 nm.

Then, in order to improve the surface roughness of glass substrate, a gas cluster ion beam etching was applied under the following conditions to polish the plate-shaped samples.

Source gas: $O_2$

Acceleration voltage: 10 kV

Cluster size: At least 1,000

Beam current: 20 μA

Dose: $1 \times 10^{16}$ ions/cm$^2$

The entire surface of plate-shaped samples of 142 mm square was irradiated. The flatness of the surface and the surface roughness of the plate-shaped samples after the polishing treatment, were measured. As a result, the surface roughness (Rms) was improved to 0.14 nm without substantially changing the flatness.

INDUSTRIAL APPLICABILITY

The polishing process of the present invention enables to polish a glass substrate having large waviness formed by mechanical polishing, to have a surface excellent in flatness, and thus, the process is suitable for polishing a high-grade glass substrate to be used for e.g. optical parts of an exposure apparatus for manufacturing semiconductors having a line width of 45 nm or smaller.

The entire disclosures of Japanese Patent Application No. 2005-026365 filed on Feb. 2, 2005 and Japanese Patent Application No. 2005-337329 filed on Nov. 22, 2005 including specifications, claims and summaries are incorporated herein by reference in their entireties.

What is claimed is:

1. A process for polishing a glass substrate, comprising measuring the surface profile of a mechanically polished glass substrate to identify the width of waviness present in the glass substrate surface, and applying dry etching using a beam having a beam size of at most the width of the waviness, the beam size being in terms of FWHM (full width of half maximum) value, to polish the surface of the glass substrate.

2. The process for polishing a glass substrate according to claim 1, wherein the beam size in FWHM value is at most a half of the size of the waviness.

3. The process for polishing a glass substrate according to claim 1, wherein the dry etching is a gas cluster ion beam etching.

4. The process for polishing a glass substrate according to claim 3, wherein the source gas for the gas cluster ion beam etching is one member selected from the group consisting of a mixed gas of $SF_6$ and $O_2$, a mixed gas of $SF_6$, Ar and $O_2$, a mixed gas of $NF_3$ and $O_2$, a mixed gas of $NF_3$, Ar and $O_2$, a mixed gas of $NF_3$ and $N_2$, and a mixed gas of $NF_3$, Ar and $N_2$.

5. The process for polishing a glass substrate according to claim 4, wherein the source gas is one member selected from the group consisting of a mixed gas of $SF_6$ and $O_2$, a mixed gas of $SF_6$, Ar and $O_2$, a mixed gas of $NF_3$ and $O_2$ and a mixed gas of $NF_3$, Ar and $O_2$.

6. The process for polishing a glass substrate according to claim 1, wherein the glass substrate is made of a low expansion glass having a heat expansion coefficient of 0±30 ppb/° C. at 20° C.

7. The process for polishing a glass substrate according to claim 6, wherein the low expansion glass is a quartz glass having $SiO_2$ as the main component.

8. The process for polishing a glass substrate according to claim 1, wherein the mechanically polished glass substrates has a flatness of at most 500 nm and a surface roughness (Rms) of at most 5 nm.

* * * * *